United States Patent [19]

Nishi

[11] Patent Number: 5,021,972
[45] Date of Patent: Jun. 4, 1991

[54] WORD PROCESSOR WITH COLOR DISPLAY MEANS

[75] Inventor: Toshio Nishi, Nara, Japan

[73] Assignee: Sharp Kabushiki Kaisha, Osaka, Japan

[21] Appl. No.: 568,634

[22] Filed: Aug. 16, 1990

Related U.S. Application Data

[63] Continuation of Ser. No. 384,873, Jul. 21, 1989, abandoned, which is a continuation of Ser. No. 133,528, Dec. 16, 1987, abandoned.

[30] Foreign Application Priority Data

| Dec. 16, 1986 | [JP] | Japan | 61-300407 |
| Dec. 16, 1986 | [JP] | Japan | 61-300408 |
| Dec. 16, 1986 | [JP] | Japan | 61-300409 |

[51] Int. Cl.$^5$ .................................. G06F 15/20
[52] U.S. Cl. .................................. 364/518; 364/521
[58] Field of Search ............... 364/518, 521; 340/701, 340/703, 748

[56] References Cited

U.S. PATENT DOCUMENTS

| 4,709,230 | 11/1987 | Popowski et al. | 340/701 X |
| 4,789,855 | 12/1988 | Ozeki | 340/703 |
| 4,853,878 | 8/1989 | Brown | 364/521 |

OTHER PUBLICATIONS

IBM Writing Assistant (1984), pp. 6–8.
IBM Writing Assistant (1984), pp. 2-1, 2,5,6,9 and 6-9 to 16, 21, 22.
Lippman et al., IEEE Computer Graphics and Applications, Jun. 1985, pp. 41–46.

*Primary Examiner*—Gary V. Harkcom
*Assistant Examiner*—Mark K. Zimmerman
*Attorney, Agent, or Firm*—Flehr, Hohbach, Test, Albritton & Herbert

[57] ABSTRACT

A word processor, including a keyboard through which characters can be inputted, a memory device for storing inputted character arrays and a display device capable of multi-color displays, is so programmed that corrections and additions are automatically displayed in a different color from the rest for the convenience of editing. Codes for indicating the color of display can be also stored in the memory device. When a completed document is finally stored in a document file, however, such color codes are deleted such that the document can be outputted in one color.

2 Claims, 3 Drawing Sheets

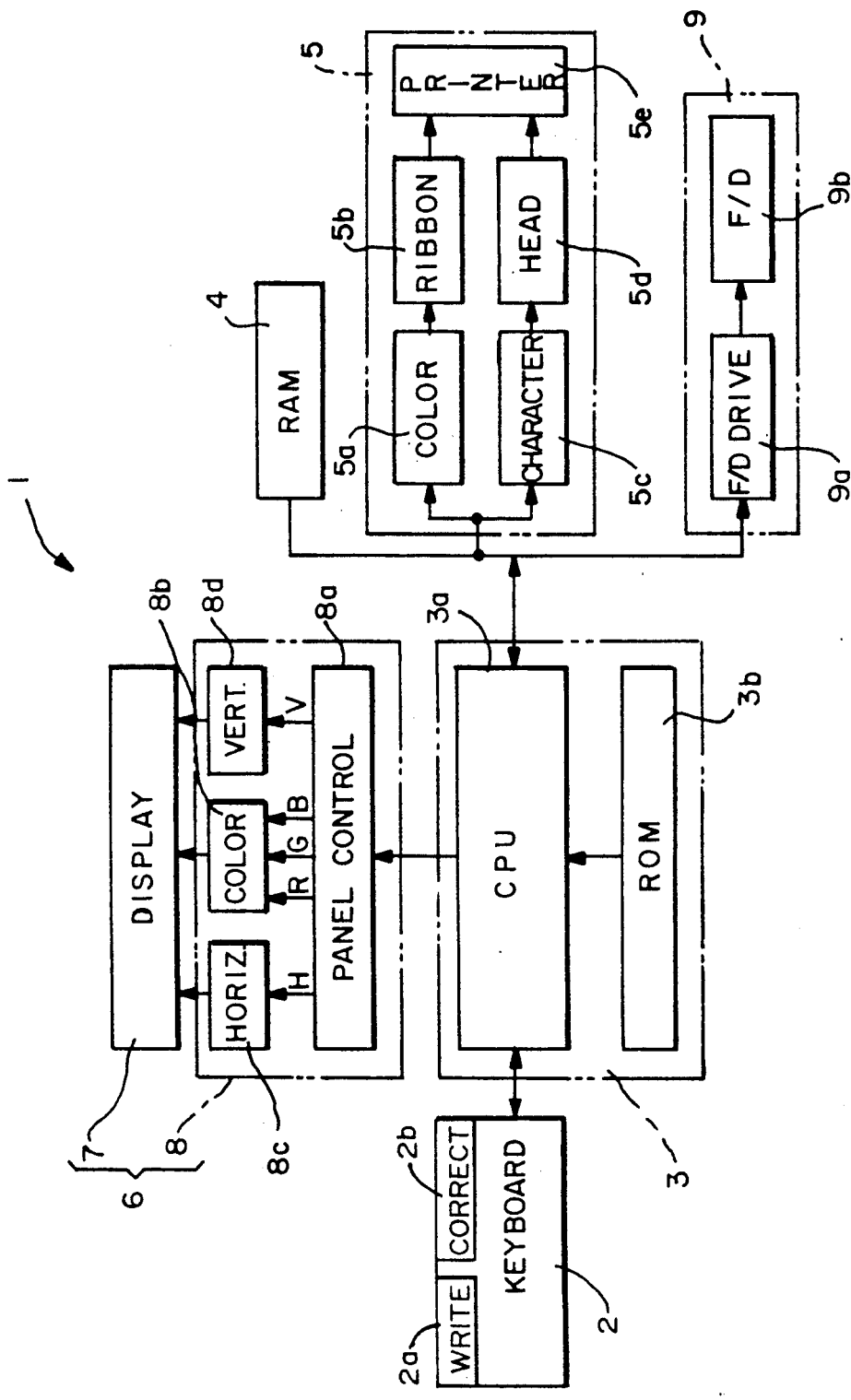
FIG.—1

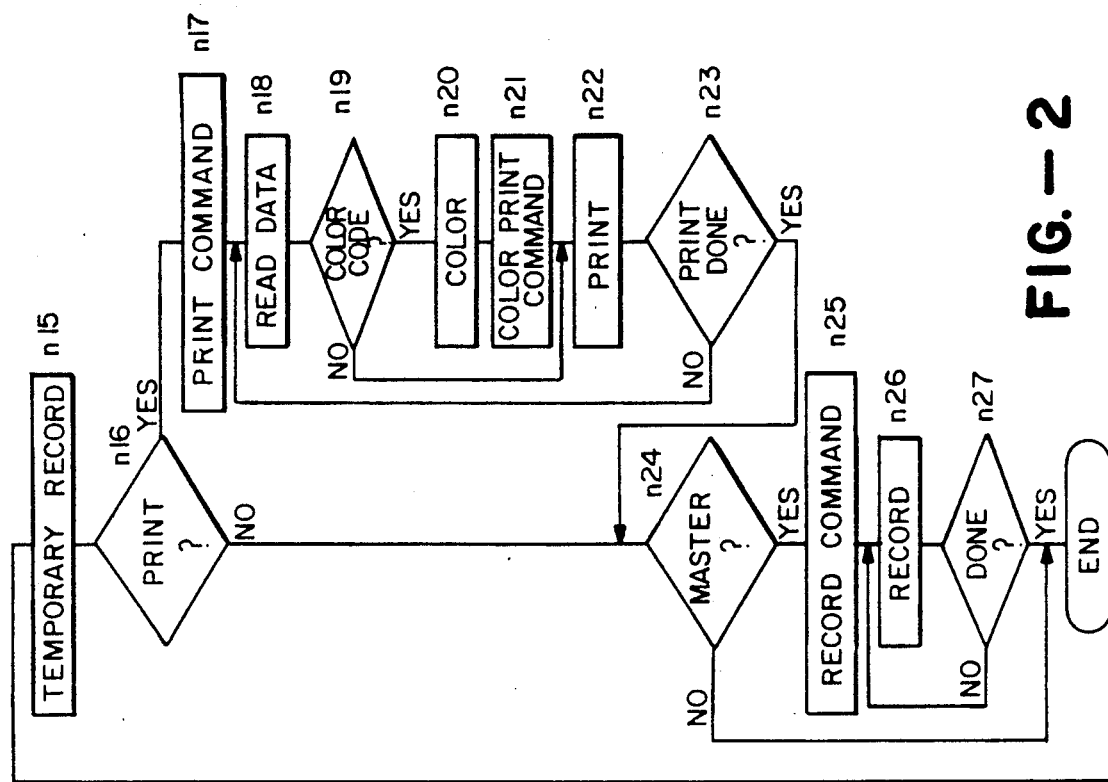
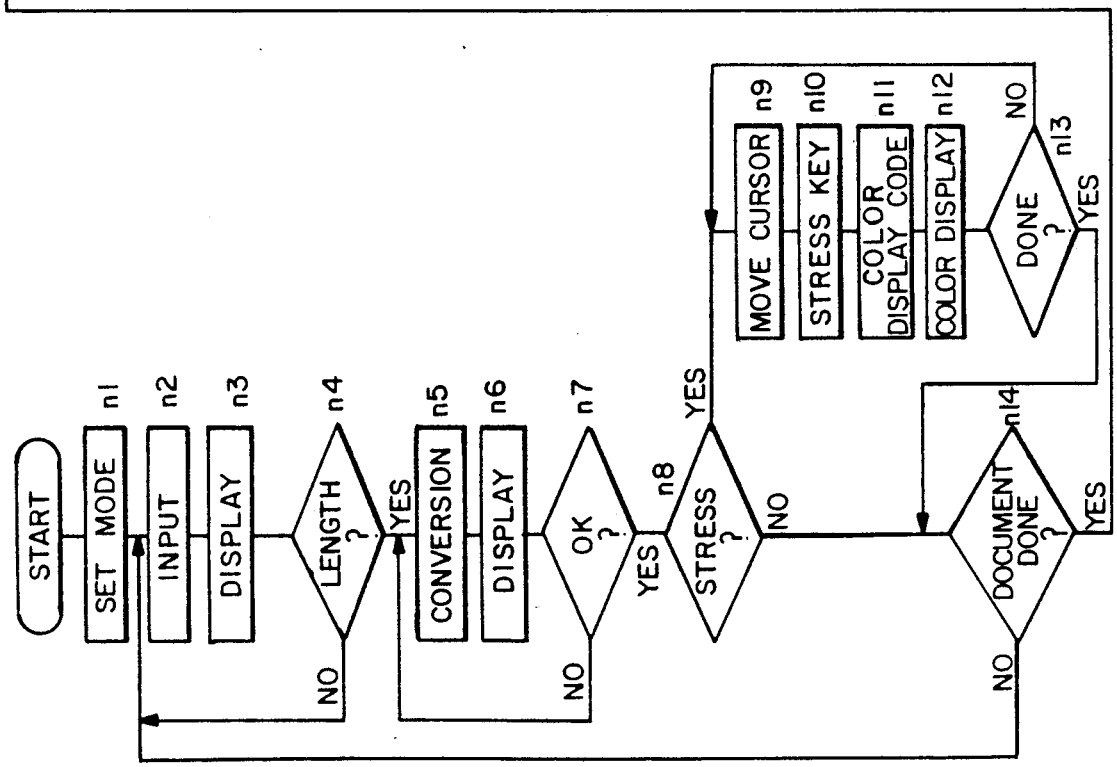
FIG.—2

WORD PROCESSOR WITH COLOR DISPLAY MEANS

This is a continuation of application Ser. No. 384,873 filed July 21, 1989, now abandoned, which is a continuation of application Ser. No. 133,528 filed Dec. 16, 1987, now abandoned.

BACKGROUND OF THE INVENTION

This invention relates to a word processor and more particularly to a word processor which uses a color liquid crystal element as its display device.

Of the type of word processors provided with input means for inputting characters and sentences, memory means for recording and storing input data and means for displaying and printing composed sentences, those which are relatively compact and inexpensive usually use as their display means a liquid crystal element capable of displaying only a limited number of lines and display characters and symbols only in one color such as black. As more sentences are inputted with such a word processor, the display on its screen keeps changing (by scrolling) and it is not a simple matter to go back and locate a particular sentence or a particular character array which was entered earlier. The user may use an underline or change the print type as an indicator but such indicators are not easily detectable.

After the user goes back to a sentence entered earlier and makes a correction therein, the corrected sentence is recorded and stored in the memory means but, unless the user leaves there a mark of some kind, it is extremely difficult later to identify the positions where corrections were made.

SUMMARY OF THE INVENTION

It is therefore an object of the present invention to provide a word processor capable of outputting specified character arrays in inputted sentences in a different color from the remaining character arrays. With such a word processor, corrected character arrays or inserted character arrays may be displayed in a different color from the rest such that the editing work can be made much easier.

When display data including such color display sections are stored in a filing means, however, color display codes for such color display sections are not deleted but are also stored as they are. As a result, when the same document is retrieved to be displayed again, the display will be in more than one color. It is therefore another object of the present invention to provide a word processor which not only displays corrected and inserted character arrays in inputted sentences in a different color from the rest but the color display codes or the like of the color-displayed character arrays are deleted when the edited data are recorded and stored as a completed document file.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 1 is a block diagram showing the electrical structure of a word processor embodying the present invention, FIG. 2 is a flow chart of the operation of the word processor shown in FIG. 1.

DETAILED DESCRIPTION OF THE INVENTION

Figure 3:
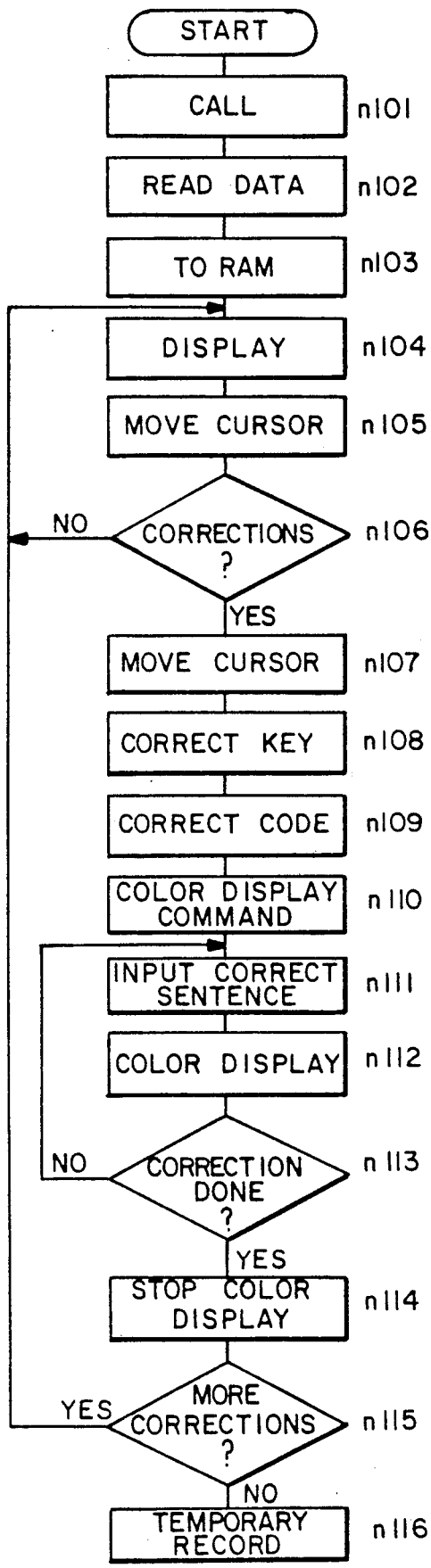
FIG. 3 is a flow chart of the operation of the word processor shown in FIG. 1 for correcting a sentence which is already stored.

With reference to the block diagram in FIG. 1, a word processor 1 embodying the present invention is comprised of a keyboard 2 serving as the input means for entering characters and sentences to form a document, a processing means 3 for processing according to a predefined program the data of inputted characters and sentences for the document to be formed, a random-access memory (RAM) 4 serving as a memory means for recording and storing as data the processed results from the processing means 3, a printing means 5 capable of printing in different colors the document data stored in the RAM 4, a display means 6 capable of displaying in different colors the sentence data stored in the RAM 4 and the processed characters and sentences inputted from the keyboard 2, and a document file means 9 for recording and storing finally completed document data.

The keyboard 2 serving as the input means has not only the function of directly inputting characters and sentences but also various other functions such as specifying stresses, corrections, storage of a sentence, color display, the color of display, color printing, the color of printing, etc. These functions are performed when the user presses an appropriate one or ones of function keys on the keyboard 2. These function keys are not individually shown in FIG. 1 but may include, as schematically shown therein, a WRITE key 2a for setting the processing means 3 in a document create mode of operation and a CORRECT key 2b for setting it in a correct mode.

The processing means 3 is comprised of a central processing unit (CPU) 3a such as a microprocessor and a read-only memory (ROM) 3b storing a predetermined program for processing data of inputted characters and sentences. The RAM 4 is a memory means and not only stores as document data the results of processing by the aforementioned processing means 3 but also outputs the contents stored therein.

The printing means 5 is comprised of a color judging circuit 5a which accepts color-specifying codes in a print command from the CPU 3, a color ribbon control circuit 5b which receives an output signal from the color judging circuit 5a and sets a printing ribbon for printing in the color specified by this output signal, a character judging circuit 5c which accepts character codes similarly in the print command, a printing head control circuit 5d which controls a printer head according to an output signal from the character judging circuit 5c to print the character specified by this output signal and a printer mechanism 5e for printing a specified character in a specified color on a sheet of recording paper (not shown).

The display means 6 includes a display device 7, for example, with a liquid crystal element and a driver circuit 8 for causing character data such as characters and sentences to be outputted on the display device 7. The driver circuit 8 is further comprised of a panel control circuit 8a, a color control circuit 8b, a horizontal direction control circuit 8c and a vertical direction control circuit 8d. The panel control circuit 8a is adapted to receive a command from the CPU 3a and to output color signals R, G and B, a horizontal direction control signal H and a vertical direction signal V for causing the specified character to be displayed in the specified color on the panel of the display device 7. The color control circuit 8b is adapted to receive the color signals R, G and B and to generate and output a signal indicative of the specified color. The horizontal direction and vertical direction control circuits 8c and 8d are respectively adapted to received the horizontal and vertical direction control signals H and V to select according thereto horizontal and vertical positions of a display unit on the display device 7.

The document file means 9 is comprised of a memory device 9b such as a floppy disk (F/D) for recording and storing finally completed document data and a driver 9a for operating this memory device 9b.

The foregoing description of a particular block diagram shown in FIG. 1 has been presented for purposes of illustration and description. It is not intended to be exhaustive or to limit the invention to the precise form disclosed. For example, although the word processor 1 is described in FIG. 1 as including so-called peripheral devices such as the printing means 5, the display means 6 and the document file means 9, an external printing device may alternatively set adjacent to the processing means 3. Similarly, a separate display means and/or a separate document file means may be used such that the word processor 1 can be made smaller and an increased degree of freedom may be obtained regarding installations of peripheral devices.

A program according to which the word processor 1 embodying the present invention may be operated is explained next by way of the flow chart shown in FIG. 2. At the beginning, the user sets the word processor 1 in the document create mode (n1). Next, the user forms a sentence from the keyboard 2 sequentially, for example, by using kana-characters (n2) and kanji-characters and sentences thus inputted are displayed on the display device 7 (n3). The user continues this inputting process while watching the displayed characters and sentences. When the inputted sentence has reached a specified length (YES in n4), the user presses a conversion key, which is one of the function keys on the keyboard 2, to effect a kana-kanji conversion and a converted kanji-display is made on the display device 7 (n6). Thereafter, the user reviews to determine whether the inputted sentence has entirely been converted into a desired form or not (n7).

After such a conversion is successfully completed, the user determines whether there is any character to be stressed, or otherwise indicated with a mark (n8). If there is, cursor keys are operated to move the cursor on the display device 7 to the desired position (n9). A stress key is pressed to switch the system into a stress mode (n10) and then a color display code is inputted from the keyboard 2 (n11) to specify the color in which the character to be stresses will be displayed. The result embodying the desired stress is displayed on the display device 7 in the selected color (n12). This step is repeated for all characters to be stressed (n13) and when this sequence is completed, the user examines whether a sentence has been formed according to the desired manner (n14). If the user is satisfied with the result, a temporary recording key is pressed (n15) to temporarily record as document data the sentence thus completed in the RAM 4. If the desired sentence has not been completed (NO in n14), the system returns to Step n2 and another input sequence is repeated.

After a completed sentence is temporarily stored in the RAM 4, if the user wishes to have it printed (YES in n16), a print key is pressed to switch the word processor 1 into a print mode (n17). Thereafter, this sentence is retrieved from the RAM 4 and displayed on the display device 7 and the print data are simultaneously transmitted to the printing means 5 (n18). The printing means 5 thereupon determines whether the transmitted sentence contains a color code specifying a color (n19). If there is no color code contained in the transmitted sentence (NO in n19), an ordinary monochromatic printing process is carried out by the printer mechanism 5e (n22).

If the transmitted sentence contains a color code, the color judging circuit 5a ascertains the color in which the associated character must be printed (n20) and outputs a color print command to the color ribbon control circuit 5b (n21). At the same time, an appropriate printing ribbon is set by the color ribbon control circuit 5b and color-printing is effected in this selected color by the printer mechanism 5e (n22). When it is ascertained that the printing has been completed (YES in n23), it is determined whether the sentence which has just been printed should be finally recorded and stored, that is, whether the so-called "master recording" is necessary or not (n24). If it is not needed, this ends the process. If master recording is required, the user presses the record key to switch the system into a record mode (n25) and the aforementioned sentence is recorded in the document file means 9 (n26). The process ends when this recording is completed (YES in n27).

In summary, the word processor described above is adapted to output specified character arrays in sentences in a different color from the rest. The user can retrieve sentences from a memory means and arrange to have specified arrays in these sentences outputted in a different color, thereby giving a stress to such character arrays. Since character codes are recorded and stored with color codes attached thereto, the user can easily locate the stressed characters such as those that were corrected or inserted at the time of editing. This makes the later editing much easier, especially with a word processor of the type capable of displaying only a few lines at a time.

FIG. 3 is another flow chart for the operation of the word processor 1 of the present invention shown in FIG. 1 when the document file means 9 already contains completed sentences and the user wishes to edit them by effecting corrections thereon. To start, the user presses a call key to retrieve the desired document (n101) and to read the data on this document recorded in the document file means 9 (n102). The document data thus retrieved are recorded in the RAM 4 (n103) and displayed on the display device 7 (n104). The user thereupon watches the characters and sentences on the display device 7 and checks whether there is a correction to be made or not. If the display area of the display device 7 is too small such that not all sentences to be examined can be displayed at once, the user operates the cursor keys on the keyboard 2 to sequentially scroll the display (n105).

When the user discovers a place in a sentence displayed on the display device 7 where a correction is required (YES in n106), the cursor is moved similarly to the position of the character to be corrected (n107) and a correction key on the keyboard 2 is pressed (n108) to specify the position to the CPU 3a. Thereupon, the CPU 3a outputs a command to the RAM 4 to insert a correction code relative to the character at the specified position and such a correction code is inserted (n109).

When the CPU 3a detects such a correction code at the time of a display, its position is displayed in a specified color which is different from the color (normally black) in which the other sections are displayed (n110), enabling the user to easily identify and review the sections where corrections were earlier effected. If the user enters a corrected sentence at one of such sections to be revised (n111) by using the character keys on the keyboard 2, the content of the correction is color-displayed on the display device 7 (n112). If desired corrections are finished at this section (YES in n113), the color display is stopped (n114) and this continues until similar corrections are finished at all such marked sections (n115). After all desired corrections are finished (YES in n115), the user presses the temporary recording key (n116) as done in Step n15 with reference to the flow chart in FIG. 2.

The foregoing description of the operating program of the word process of the present invention has been presented also for purposes of illustration and description. It is not intended to be exhaustive or to limit the invention to the precise form disclosed. For example, Step 109 in the flow chart of FIG. 2 may be changed such that, after the cursor is moved (n107) and the correction key is pressed (n108), the user is allowed to freely select a color of display. Thus, Step n109 in the flow chart of FIG. 2, according to this alternative embodiment, may be replaced by Step n109-1 wherein the user operates color code keys on the keyboard 2 to select a color in which the section to be corrected is to be displayed, thereby giving the CPU 3a a command regarding the choice of color, and Step 109-2 wherein the CPU 3a, upon receiving this command regarding the display color, outputs a signal to the RAM 4, indicating the insertion of the aforementioned correction code at the specified position. According to this program, when the specified section is displayed on the display device 7, the CPU 3a reads this correction code and the color-display is effected in the selected color in Step n110.

If the user can select the color of display like this, different meanings may be assigned to different colors to make the editing work easier. For example, the user may display deleted sections in red, inserted sections in blue and sections intended to be corrected later in green. Although only applications to corrections have been mentioned above by way of illustration, it goes without saying that displays in different colors can be utilized for many different purposes. The basic advantage of the present invention according to this embodiment described above is that such correction codes can be recorded as well as character and sentence data.

Figure 4:
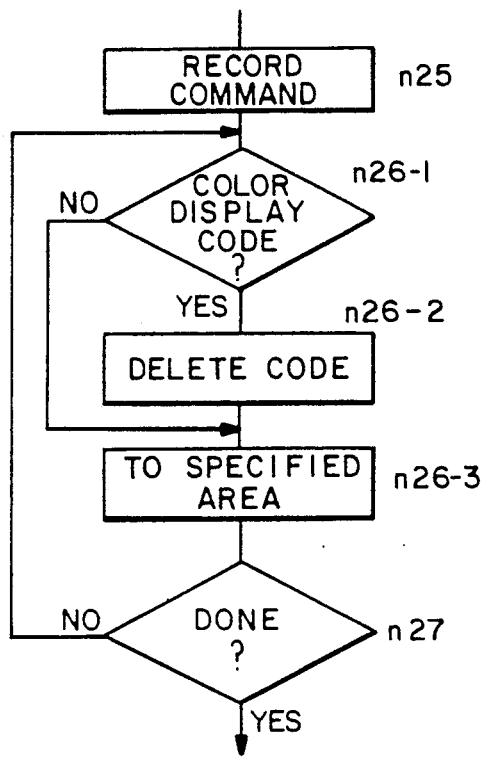
FIG. 4 is a portion of a flow chart replacing Step n26 of FIG. 2 according to another embodiment of the present invention.

A still another embodiment of the present invention relates to still another variation in the operating program such that the color display code can be deleted when the edited data are finally stored as a completed document file and that the completed (finally corrected) document can be printed in a single (usually black) color. According to this program, Step n26 in the flow chart of FIG. 2 is replaced, as shown in FIG. 4, by Step n26-1 wherein, after the system is switched into the record mode in Step 25 as explained above in connection with FIG. 2, the document file means 9 checks the presence or absence of the aforementioned correction codes relating to a selected display color as data to be recorded and stored therein are received, Step n26-2 wherein, if a correction code relating to a selected display color is deleted in Step n26-1, it is deleted before data are recorded, and Step n26-3 wherein only character data are recorded at specified areas of the floppy disk (or another kind of memory means) 9b of the document file means 9. With a program thus modified, various specified sections of a document can be displayed in selectably different colors for the convenience of editing but color codes for indicating the choices of color in display are deleted when the completed document is finally recorded and stored such that when the corresponding data are retrieved later, the completed document is prevented from appearing in different colors which were convenient only during the editing process.

What is claimed is:

1. A word processor capable of color-displaying character arrays, comprising
    an input means provided with character input keys for inputting characters, a write-mode setting means and a correct-mode setting means,
    a document memory means for storing inputted character arrays as document data,
    a display means capable of color-displaying character arrays thereon, and
    a processing means for controlling said input means, said document memory means and said display means, said processing means being programmed
    to insert a correction code, when said correct-mode setting means is operated after a cursor is moved to a correction-requiring position within a displayed character array on said display means, at a corresponding position in said document memory means according to said correction-requiring position,
    to cause, if said correction code is detected in said document memory means when a display is being made on said display means, the characters at said correction-requiring position to be displayed in a different color from a normal display color,
    to display on said display means, if correcting characters are inputted through said input means when a correction-requiring position is displayed in said different color, said correcting characters at said correction-requiring position in a still different color, and
    to change the display on said display means from said different colors to said normal display color when said write-mode setting means is operated.

2. The word processor of claim 1 wherein said input means include keys for specifying different colors.

* * * * *